United States Patent
Benzing, II (10) Patent No.: US 6,592,704 B1
(45) Date of Patent: Jul. 15, 2003

(54) FORMING SPLICE JOINTS FOR ELASTOMERIC MATERIALS

(75) Inventor: James Alfred Benzing, II, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/869,232

(22) PCT Filed: Mar. 3, 1999

(86) PCT No.: PCT/US99/04599

§ 371 (c)(1),
(2), (4) Date: Jun. 25, 2001

(87) PCT Pub. No.: WO00/51810

PCT Pub. Date: Sep. 8, 2000

(51) Int. Cl.[7] ............................................. B32B 31/10
(52) U.S. Cl. ................. 156/264; 156/268; 156/304.1; 156/304.5; 156/512; 83/51
(58) Field of Search ............................... 156/157, 159, 156/304.1, 304.5, 264, 268, 257, 510, 512; 83/51

(56) References Cited

U.S. PATENT DOCUMENTS

| | | | |
|---|---|---|---|
| 2,309,305 A | * 1/1943 | Dahlstrom et al. | 451/531 |
| 2,350,861 A | * 6/1944 | Argy et al. | 451/531 |
| 2,431,035 A | * 11/1947 | Goepfert et al. | 451/531 |
| 3,895,990 A | 7/1975 | Josteit | 156/304 |
| 4,783,229 A | * 11/1988 | Mizuhara | 156/89.24 |
| 5,273,601 A | 12/1993 | Sergel et al. | 156/133 |
| 5,746,101 A | 5/1998 | Benzing, II et al. | 83/34 |
| 5,746,102 A | 5/1998 | Benzing, III et al. | 83/34 |

FOREIGN PATENT DOCUMENTS

| | | | |
|---|---|---|---|
| AU | 262731 | * 10/1963 | 156/157 |
| EP | 0444573 | 9/1991 | B29D/30/46 |
| EP | 0483973 | 5/1992 | B26D/7/08 |
| FR | 2405815 | 5/1979 | B29H/3/06 |

OTHER PUBLICATIONS

Patent Abstracts of Japan, vol 018, No 220 (M–1595), Apr. 20, 1994, and JP 06 016013 A (Bridgestone Corp), Jan. 25, 1994 figures 2 and 3c of JP 06 016013 A abstract.

Patent Abstracts of Japan, vol 017, No 664 (M–1523), Dec. 8, 1993, and JP 05 221204 A (Yokohama Rubber Co Ltd The), Aug. 31, 1993 abstract.

Patent Abstracts of Japan, vol 017, No 565 (M–1495), Oct. 13, 1993 and JP 05 162221 A (Yokohama Rubber co Ltd The), Jun. 29, 1993 abstract.

Patent Abstracts of Japan, vol 017, No 073 (C–1026), Feb. 15, 1993 and JP 04 278064 A (Yanagiya K K) Oct. 2, 1992 abstract.

* cited by examiner

Primary Examiner—Mark A. Osele
(74) Attorney, Agent, or Firm—David L. King (57) ABSTRACT

The invention describes a method and apparatus for forming splice ends for elastomeric strips. The splicing ends each have a low angle splicing surface and an abutment surface. The combination of surfaces provide a precise way to locate and join splices.

22 Claims, 8 Drawing Sheets

FORMING SPLICE JOINTS FOR ELASTOMERIC MATERIALS

TECHNICAL FIELD

This invention relates to forming a segment of elastomeric material to a predetermined length having tacky splicing surfaces at each end of the segment, the segment being formed from a strip of elastomeric material. In particular, the formation of a combination of low angle skived splicing surface with an abutment surface at each end of the segment is taught.

BACKGROUND ART

Elastomeric materials, particularly those used in the manufacture of tires, belts and other such industrial products requiring vulcanization of the elastomer are well known for having tacky surfaces which can readily be stuck together particularly prior to being completely cured or vulcanized. It is this very tacky surface feature that has enabled manufacturers to assemble various elastomeric components together in layers or composites of different shapes or compound materials without requiring additional adhesives or cements.

This pre-assembly of components is most common in the tire industry wherein layers of elongated elastomeric strips are cut to length and cylindrically wound and spliced upon a first stage building drum prior to being toroidally shaped and placed in a vulcanizing curing press.

Often the strips are formed from a homogeneous single elastomeric compound. Alternatively strips of tire components can be formed of multiple layers or composites having differing materials. Often one or more of the strips of tire components may have elastomeric material with reinforcing cords or fibers.

With the need to increase manufacturing efficiency, many of these strips of tire components are now formed as subassemblies or laminates having many components pre-assembled in sheets or strips of material as is described in U.S. Pat. No. 5,762,740. These laminated elastomeric materials when used are cut from elongated strips. In some cases the strips are sufficiently thick to permit the cut ends to be jointed in an abutting relation commonly referred to as butt splicing. Often the strips are cut on a skive angle and the ends are spliced as close as possible along the cut surfaces as is described in U.S. Pat. Nos. 5,746,101 and 5,746,102.

One advantage of butt splices are the cut to length segment has easy to detect ends making it possible to make a splice with no overlapping material. In the manufacture of tires, overlapping ends of material create mass distribution irregularities that can affect the ride and handling performance of the resultant tire. Butt splice's one major drawback is the lack of adhesion at the joint due to the minimal contact area at the joint. Accordingly, butt splices can separate or disjoin at the splice during the shaping or curing of the tire if a sufficient surface area or thickness is not available. In those cases a splicing strip of gum rubber can be overlaid onto the splice joint again creating a mass distribution problem.

Skive cut surfaces or simply very thin strips are often lap spliced. In such a case, the components cut ends overlap slightly to provide increased surface area for joint adhesion. While lap splicing yields very good joint adhesion, the very existence of these joints contribute to tire non-uniformities such as sidewall undulations, uneven tread wear and tire imbalances as discussed above.

One of the most promising solutions to these problems is to provide splicing surfaces of sufficient area to enhance joint adhesion. The most promising solution has been to provide low angle skiving which forms cut angles less than 30 degrees relative to the plane of the material. This technique is particularly useful in strips of material having a moderate to thick cross-section such as the multi-layered laminates or composites. Such a technique of very low angle cutting is disclosed in PCT Application No. PCT/98/10387.

In cutting a non-reinforced tread strip for example it is relatively easy to achieve low skive angle cuts. Alternatively, low angle skive cutting cord reinforced strips or elastomeric composites with at least one layer of parallel cords can be much more difficult requiring special cutting techniques as disclosed in U.S. Pat. Nos. 5,746,101 and 5,746,102.

One of the problems associated with low angle cutting has been that it is not easy to align the cut ends, precisely. Unlike the butt splice, there is no clear indication when the cut ends are aligned. Low skive angle cuts are neither readily observable nor detectable as they are being joined. The one cut end when being attached to the other end obstructs the view. The stitched together joint is either overlapping or slightly underlapping. The very thin tips of the low angle skive cuts are easily deformed and damaged while the interior portion of the cut surface is barely discernable from the uncut surface, for these reasons the tire builder whether a man or an automated machine has a somewhat difficult time achieving a precise strip joint.

As a general rule the strip has a cut length slightly smaller than required which enables the strip to be stretched locally at the joint. This localized stretching can result in non-uniform cord spacing in the resultant tire. An example of splicing an elastomeric joint from a strip of elastomeric material can be found in U.S. Pat. No. 5,273,601. Stretching of strips to make a joint insures that entrapped air and ply or strip wrinkling is avoided. If the strip has parallel cords, as in the example of a radial ply used in the manufacture of a tire, localized stretching can change the cord spacing creating another non-uniformity. It is most important to note that uniformity is generally always desirable and that non-uniformities are almost always something to be avoided or eliminated in the manufacture of a tire splice.

The conventional wisdom in the manufacture of tires for example is that the number of splices should be minimized and if required at all the splices should be staggered around the circumference to minimize localized non-uniformities when multiple splices are circumferentially aligned.

One of the objects of the present invention is to provide a spliced joint that has a strip with ends that are easily and precisely located by employing a method and an apparatus for forming single or multi-component segments of elastomeric material of a predetermined length having ends exhibiting low angle splice surfaces for joint splicing in combination with abutment surfaces that are readily detectable by the tire builder.

Another object of the invention is to provide a method and apparatus that precisely achieves the same uniform joint repeatably and predictably wherein the strip of elastomeric material can be formed of a predetermined length without requiring the necessity of over stretching the strip.

Another object of the invention is to provide the above-mentioned splice joint on strips of material that have variations in cross-sectional thickness across the width of the strip or in flat strips having uniform thickness whether the strip is made of a single elastomeric material or a multi-layered components of different material compounds some of which may contain at least one layer of parallel cords oriented in a similar direction.

DISCLOSURE OF INVENTION

SUMMARY OF THE INVENTION

A method for forming a segment (10) of elastomeric material of a predetermined length $L_1$ having tacking splicing surfaces (6) at each end (12, 14) from a strip (1) of elastomeric material is disclosed. The strip (1) has a length L, a width W, a maximum thickness t as measured across the width of the cross-section, a first side (2) and an opposite second side (4).

The method has the steps of a) forming a low angle skive surface (6) across the width W of the strip (1). The low angle skive surface (6) extends from a first side (2) of the strip (1) to a predetermined depth (d), (d) being less than the maximum thickness t of the strip (1); b) forming an abutment surface (8), the abutment surface (8) extending from the opposite second side (4) of the strip (1) across the width W of the strip (1) in a path substantially parallel to the low skive angle surface (6) and intersecting the low angle skive surface (6) thereby forming a first end (12) of the strip (1), the abutment surface (8) being at a first location $S_1$, then repeating steps (a) and (b) at a second spaced location $S_2$ spaced a predetermined distance $L_1$ along the length L of the strip (1) from the location $S_1$ thereby forming the segment (10) of elastomeric material of a predetermined length $L_1$ and an opposite second end (14), wherein one of the ends (12, 14) has a low angle skive surface (6) extending inwardly along the length $L_1$ of the segment relative to the ends abutment surface (8) at location $S_1$ and the opposite end has a low angle skive surface (6) extending outwardly along the length $L_1$ of the segment relative to the abutment surface (8) of that respective end (12 or 14) at location $S_2$.

The method may further include the step of forming the segment (10) into a substantially cylindrical shape by the step of splicing the first and second ends (12, 14). The step of splicing the ends (12, 14) includes the step of contacting the abutment surfaces (8) of each end (12, 14) thereby establishing the circumferential length $L_1$ of the cylindrical segment and applying pressure along the low angle skive surfaces (6) thereby forming a splice joint.

It should be understood that the step of forming a first end (12) of one segment (10) preferably simultaneously includes the step of forming a second end (14) of an adjacent segment (10) from the strip (1) of elastomeric material.

The preferred method further can have the step bending the strip (1) of elastomeric material across the width W of the strip (1) along a path (3) covering an area wherein a low angle skive surface (6) is to be formed. This bending the skive surface (6) of one end (12 or 14) separates and spaces it from the skive surface of the adjacent segment (10) as both surfaces (6) are being simultaneously formed. This prevents the tacky surfaces (6) from self-adhering back together as the surfaces (6) are being formed, a somewhat unique problem associated with uncured or partially cured rubber or elastomeric materials.

Alternatively a means to prevent the aforementioned reattachment of adjacent low angle skive surfaces (6) can be provided. The means can be vacuum apparatus to hold one surface (6) away from the other or a mechanical separations sheet or liner interposed between the surfaces (6) as they are formed.

In one method, the step of assembling a plurality of strips of tire components to form the strip (1) of elastomeric material, one or more of the strips of tire components being unvulcanized or partially vulcanized, is employed. In that method the assembly of tire components may include at least one strip of elastomeric material having reinforcing cords (22). The cords (22) are substantially parallel and oriented similarly in the direction of a path (3) formed across the width W of the strip (1) by the ends (12, 14) of the segments (10) being formed.

The method of forming a low angle skive surface (6) preferably includes step (a) of cutting the elastomeric strip (1). The first cutting is oriented at a predetermined skive angle θ, the first cutting being limited to the predetermined depth (d) and the step (b) of forming the abutment surface includes the step of making a second cut across the strip intersecting the first cut, thus, forming one end (12 or 14) of the segment (10).

In the case of forming low angle skive surfaces (6) with at least one layer of cord (22) reinforced material in the strip (1) a preferred method further includes the step (a) of cutting across the strip (1) in a direction of a cut path (3) substantially parallel and oriented similarly to the cords (22) using a first cutting element (120). The first cutting oriented at a desired skive angle θ, cuts to the depth (d). The depth (d) is substantially tangent to one or more cords (22). The step (b) of forming an abutment surface (8) includes the step of cutting across the strip (1) between two adjacent cords (22) with a second cutting element (122) intersecting the first cut at or near the depth (d), thus, forming one cut end of the segment (12 or 14). It is further preferred that the step of bending the elastomeric strip (1) along a path parallel to the cords (22) is used to prevent the surfaces from reattaching as previously mentioned. To accomplish this step, the strip (1) should be supported in the area of the bend path preferably on a side (4) opposite the side (2) of the first cut. This can best be accomplished by providing a contoured or inclined support (108) adjacent a substantially flat or planar support (110).

Additionally, when making a second cut across the strip (1), the cutting preferably initiates from a side (4) of the strip (1) opposite the first cut.

The first cut is made by a first cutting element (120), the first cutting element (120) preferably being an ultrasonic knife.

The second cut may be made by one or more second cutting elements (122). The second cutting element (122) may be any convention knife or blade and may be heated or ultrasonically vibrated to facilitate cutting. The second cutting preferably has the knife (122) passing between two adjacent cords (22) along the cutting path. The second cutting element is preferably oriented at an angle β, β being at a high angle relative to the first or second side (2, 4) most preferably about normal. The second cut can either be initiated at an edge of the step or anywhere in-between. If two cutting elements (122) are used, they can initiate cutting midway in the strips width and extend in opposite directions to accomplish the cut.

The preferred apparatus (100) for cutting segments from a long strip (1) of multi-layered elastomeric material has a first cutting element (121), a second cutting element (122), a means (130) for moving the first and second cutting elements (121, 122) across the width of the strip (1) along a cut path (3), and a means for supporting (140) the strip. The apparatus (100) also has a means (104) for orienting and maintaining the first cutting element (120) at a desired skive angle θ. The means for supporting (140) preferably includes a first flat portion (110) and a second inclined or contoured portion (108).

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about a 25–65° angle with respect to the equatorial plane of the tire, the ply cords running at opposite angles in alternate layers.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the crescent—or wedge-shaped reinforcement typically used to reinforce the sidewalls of runflat-type tires; it also refers to the elastomeric non-crescent-shaped insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Skive" or "skive angle" refers to the cutting angle of a knife with respect to the material being cut; the skive angle is measured with respect to the plane of the flat material being cut.

BRIEF DESCRIPTION OF DRAWINGS

The structure, operation, and advantage of the invention will become further apparent upon consideration of the following description taken in conjunction with the accompanying drawings wherein.

DETAILED DESCRIPTION OF THE INVENTION

Figure 1:
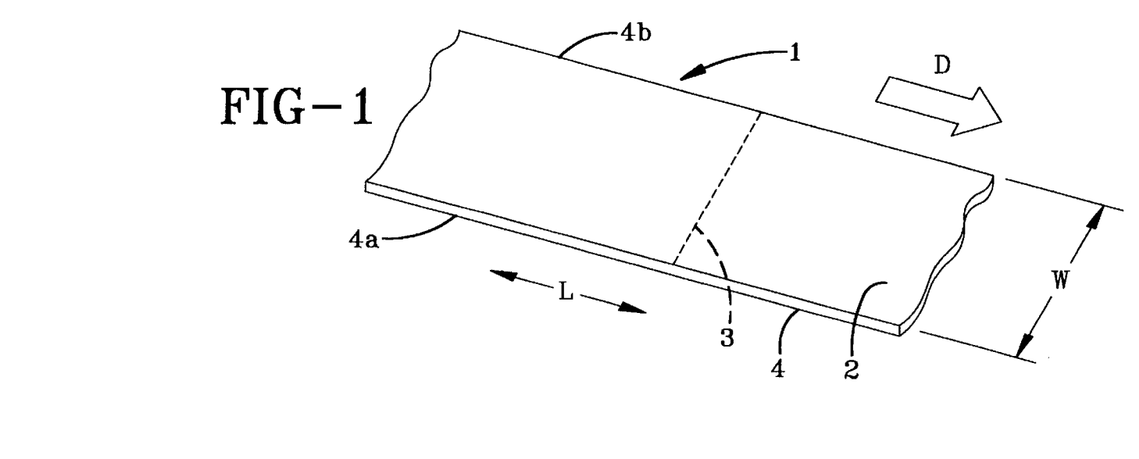
FIG. 1 is a schematic view of a multi-component strip (1) of elastomeric material, showing a path (3) where the ends of a segment are to be formed.

With reference to FIG. 1, a strip of elastomeric material is illustrated in oblique view. The strip (1) has a transverse width W and an indefinite length designated by the L direction. The strip (1) is transported upon a conveyor means (not shown) in the direction D. The strip (1) comprises one or more elastomeric components. The dotted line (3) shows the location or path of a lateral cut that is to be made across the width of the strip (1) of elastomeric material.

The path (3) which extends across the width W of the strip (1) can be perpendicular to the length L of the strip or obliquely traversing across the width $W_T$. If the strip (1) has one or more layers of parallel cords (22) that are similarly oriented, then it is preferred that the path (3) is similarly oriented relative to the cord (22) path. If the strip (1) is not reinforced by cords (22), then the location or path (3) can be in whatever path direction provides a sufficient amount of splice surface area. In some cases, the oblique path (3) may be preferred to satisfy the need for increased splice adhesion surface area.

Figure 2A:
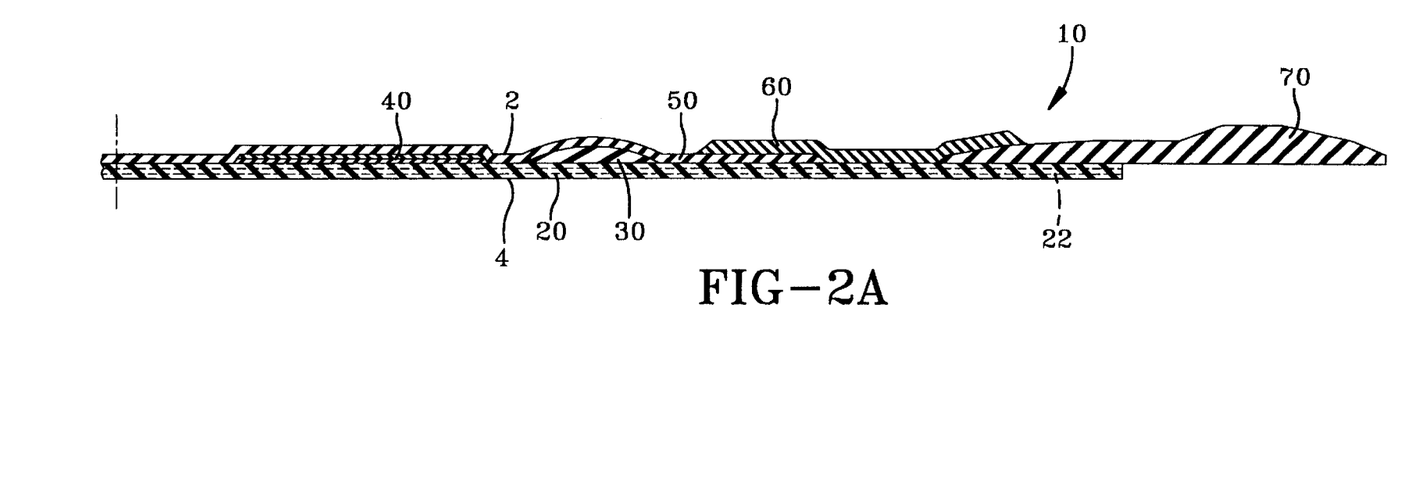
FIGS. 2A and 2B are detailed views of one type of multi-component strip of elastomeric material shown in FIG. 1.
Figure 2B:
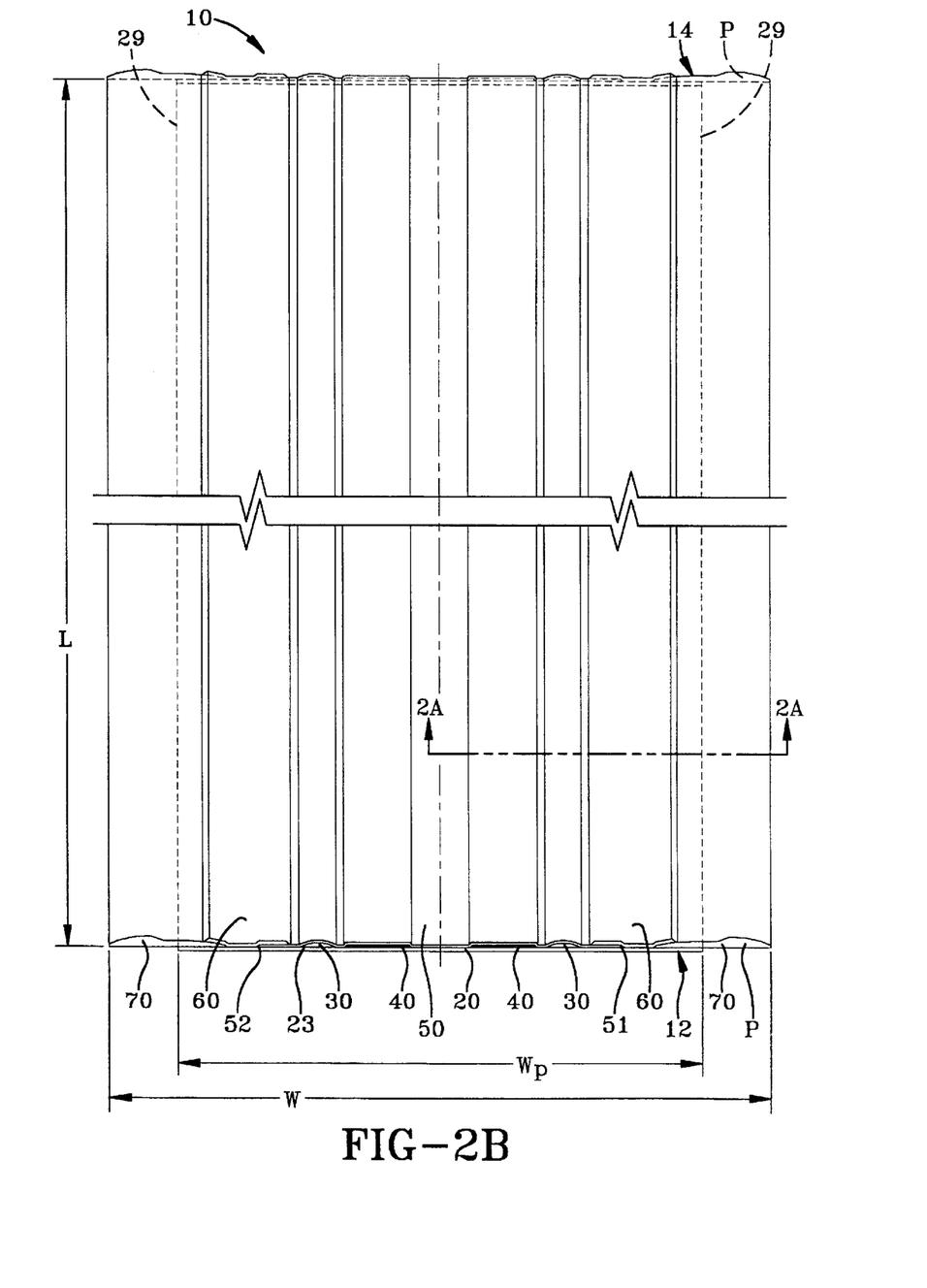
Figure 3:
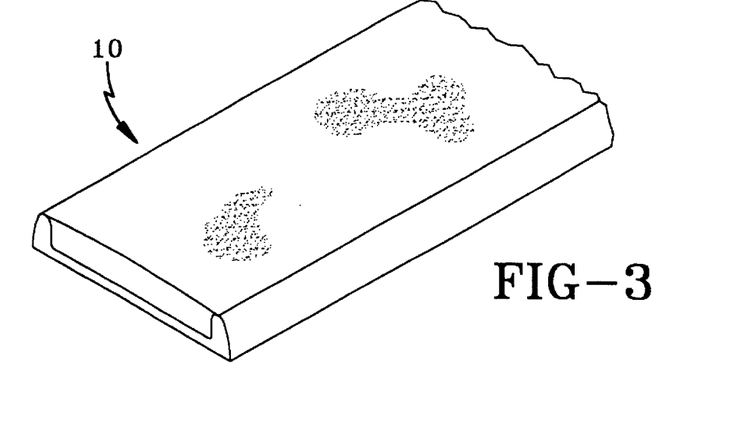
FIG. 3 is a detailed view of a strip of elastomeric material for a tread or sidewall.
Figure 4A:
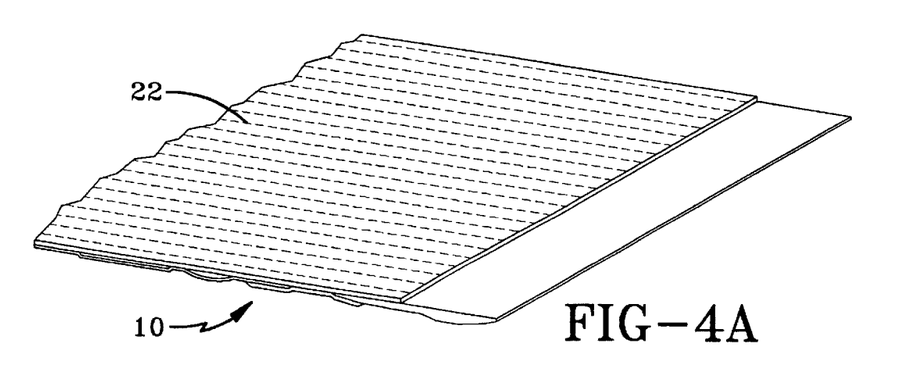
FIG. 4A is a detailed view of a multi-component cord reinforced elastomeric strip wherein the cords are in a parallel layer oriented at a bias angle relative to the length of the strip.
Figure 4B:
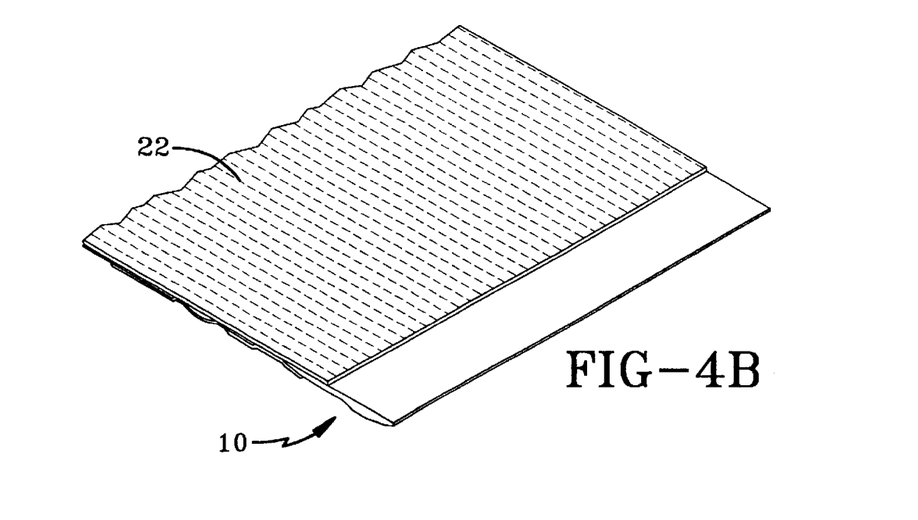
FIG. 4B is a detailed view of a multi-component cord reinforced elastomeric strip wherein the cords are in a parallel layer oriented at an angle normal to the length of the strip.

In the various figures shown, the elastomeric strips (1) are various components used in the manufacture of tires. FIGS. 2A and 2B, for example, is a detailed view of a multi-component strip (1) of elastomeric material, the strip (1) as shown has ply (20) inserts (30), shoulder gum strips (40), a liner (50), a pair of chaffer strips (60), and a pair of sidewall components (70). In FIG. 3, the strip is a strip of non-cord reinforced material for a tread or a sidewall component for a tire. In FIGS. 4A and 4B, multi-component strips are shown. In FIG. 4A, the combination of tire components of FIG. 2 are combined with a bias ply (20) reinforced by cords (22) that are parallel and similarly oriented at an oblique angle relative to the length of the ply (20), generally in an angular orientation of 30° to 65°. In FIG. 4B, the combination tire components of FIGS. 2A and 2B is combined with a ply (20) having parallel and similarly oriented cords (22) that are inclined at an angle in the range of 65° to 90° relative to the length of the strip (1). In FIGS. 4A and 4B, the cords of the multi-component strip (1) are substantially shorter in length than the path (3) across the strip. In such a case, the ends of the cords (22) are not exposed making it very difficult to form a splice end without cutting or damaging a cord (22). While the inventive method of the present invention is not limited to the creation of splice surfaces for tire components and is readily applicable to any elastomeric strip having tacky surface adhesion properties, for the purpose of discussing the inventive method and apparatus, tire components as described above will be used to exemplify the inventive principles of the claimed method and apparatus.

In practicing the invention, it is understood that the forming of the ends (12, 14) of a segment (10) taken from a strip (1) of elastomeric material is accomplished in a similar way regardless of the component types. This is true if the strip (1) is reinforced with parallel cords (22) or not reinforced with cords. The only additional consideration when cords (22) are in the strip (1) is that the depth of the first cutting and the second cutting must take into consideration the location and orientation of the cords (22).

Figure 5A:
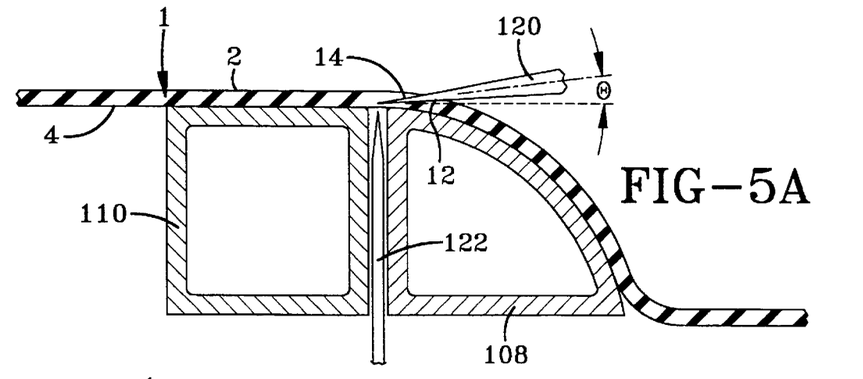
FIG. 5A is an edge view of an elastomeric strip showing the forming of the low skive angle surface (6).
Figure 5B:
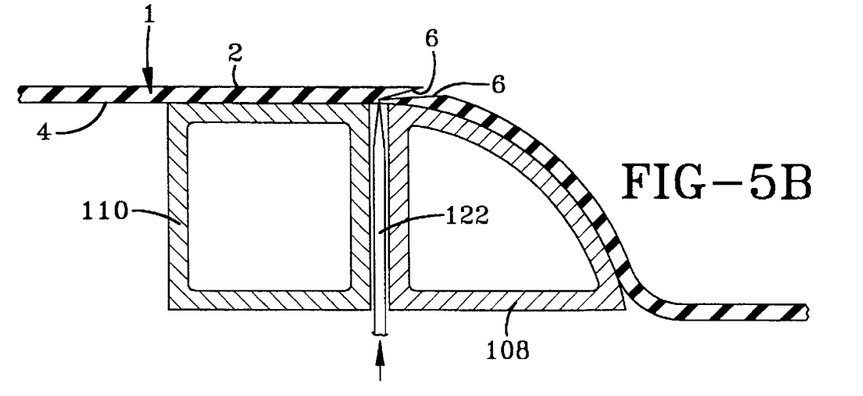
FIG. 5B is an edge view of the preferred method of after forming the low angle skive surface and abutment surface (8) on an elastomeric strip.
Figure 5C:
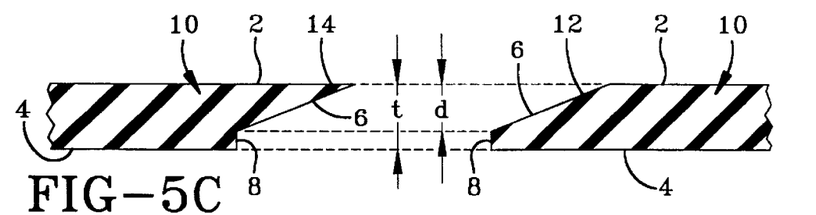
FIG. 5C is an edge view of the preferred method of forming the ends (12, 14) on the elastomeric strip of FIG. 5B.
Figure 5D:
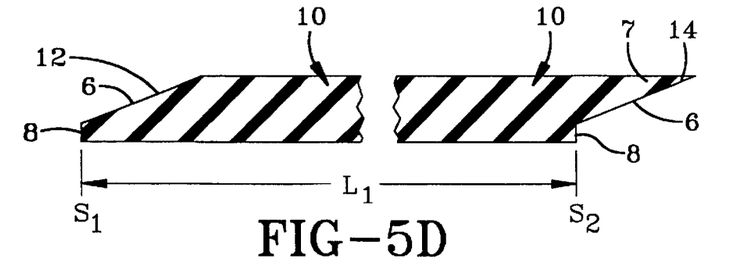
FIG. 5D is an edge view of the preferred method of the cut segment (10) from the elastomeric strip (1) of FIG. 5C.

In practicing the invention, as shown in FIGS. 5A through 5D, a strip (1) of elastomeric material is shown on an edge view. As shown in FIG. 5A, the preferred method has the strip (1) supported on a second side (4) and a first cutting element (120) passes through the strip (1) along a path that transverses across the entire width of the strip (1). The first cutting element (120) is positioned to cut at a very low skive angle $\theta$ of less than 30° relative to the first side (2) of the strip (1) to a depth (d) the depth (d) being less than the total depth or thickness t of the strip (1). In other words the first cut does not cut through into the second side (4). As shown in FIG. 5B after the first cut is initiated, a second cut is made from the second side (4) to a depth intersecting the cutting path or plane (P) of the first cut, preferably intersecting the low angle skive surface (6) formed by the first cutting element (120) at a depth preferably sufficient to meet the location of the first cut depth (d). This second cut is preferably made by a second cutting element (122) set at an angle $\beta$, $\beta$ being at a high skive angle most preferably about normal to the second side (4). This resultant cutting forms a low skive angle surface (6) for splicing which extends across the width of the strip (1) and an abutment surface (8) which also extends across the width of the strip (1). The combination of the low skive angle surface (6) and the abutment surface (8) create unique ends (12, 14) for a splicing joint. The abutment surface (8) forms a distinct and abrupt surface which creates an indicator as to where the first and second ends (12, 14) should be joined when making a splice.

Figures 8A, 8B:
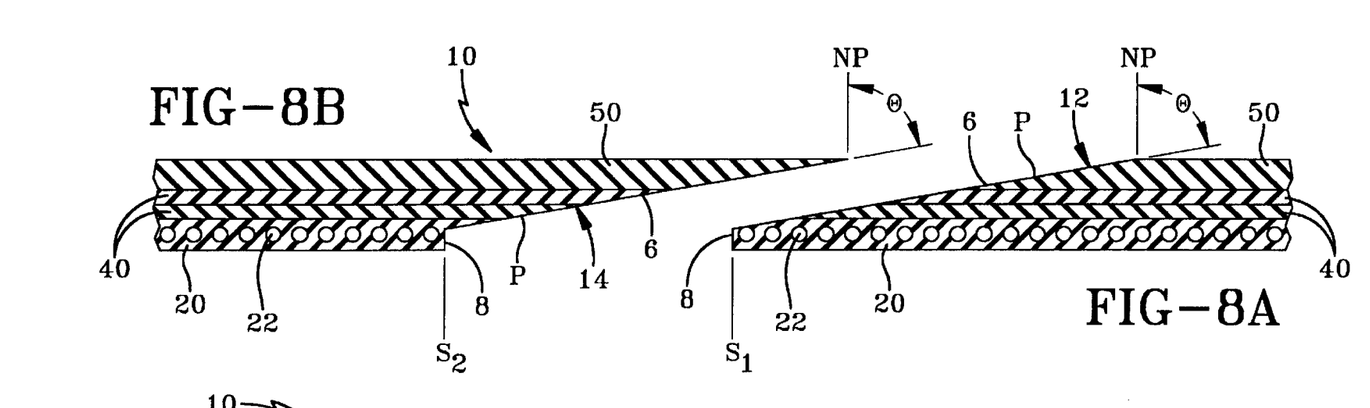
FIG. 8A is an edge view of the segment first end.
FIG. 8B the second end.

The first end (12) as shown in FIG. 8A has the low angle skive surface (6) extending inward along the length of the segment from the abutment surface at location $S_1$.

Figures 6A, 6B:
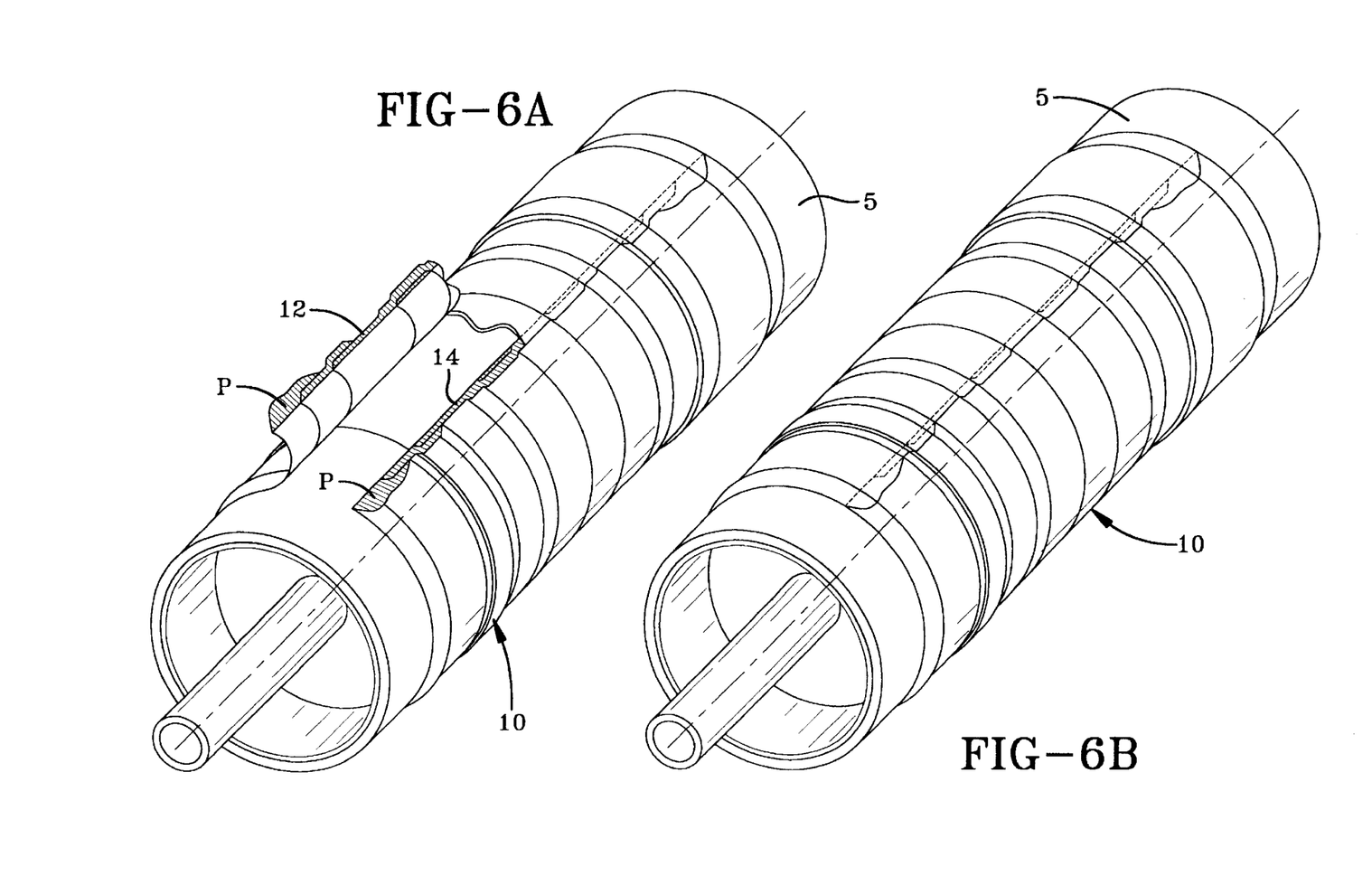
FIG. 6A is a perspective view showing the segment being formed cylindrically about a tire building drum.
FIG. 6B is a perspective view of the cylindrically formed segment of FIG. 6A.

In FIG. 8B, the second end (14) has the abutment surface (8) at location $S_2$ and the low skive angle surface (6) extends outwardly from the location $S_2$ forming an elastomeric flap (7) ideally suited for forming the splice joint when the first end (12) is spliced to the second end (14). In tire building this joining of the splice ends occurs when the cut to length segment is cylindrically formed around a tire building drum as shown in FIGS. 6A and 6B. As shown the tire builder ideally brings the abutment surfaces (8) together in a butting relationship. This precisely sets the circumferential length of the segment (10). The low angle skive surfaces (6) are then pressed together in a technique commonly referred to as stitching.

As can be readily seen in FIGS. 5A–5D, the method of forming the first end (12) of a segment (10) simultaneously forms the second end (14) of an adjacent segment (10). By fixing the apparatus (100) cutting elements (120, 122) for forming these ends insures that the cut or formed surfaces when joined have precisely the correct amount of elastomer. Since the abutment surfaces (8) when aligned and abuttingly joined fixes the location the low skive angle surfaces (8) when mated together the amount of elastomer is for all practical purposes precisely the same as the remainder of the segment (10). This feature insure no mass imbalances can occur at the splice. This feature is capable of being fully used in automated or manual tire building. The resultant effect is that the splice joint has the precision of butt splicing on strips (1) having irregular thickness or are very thin while also having the superior surface adhesion area found in lap type splices.

Figure 8C:
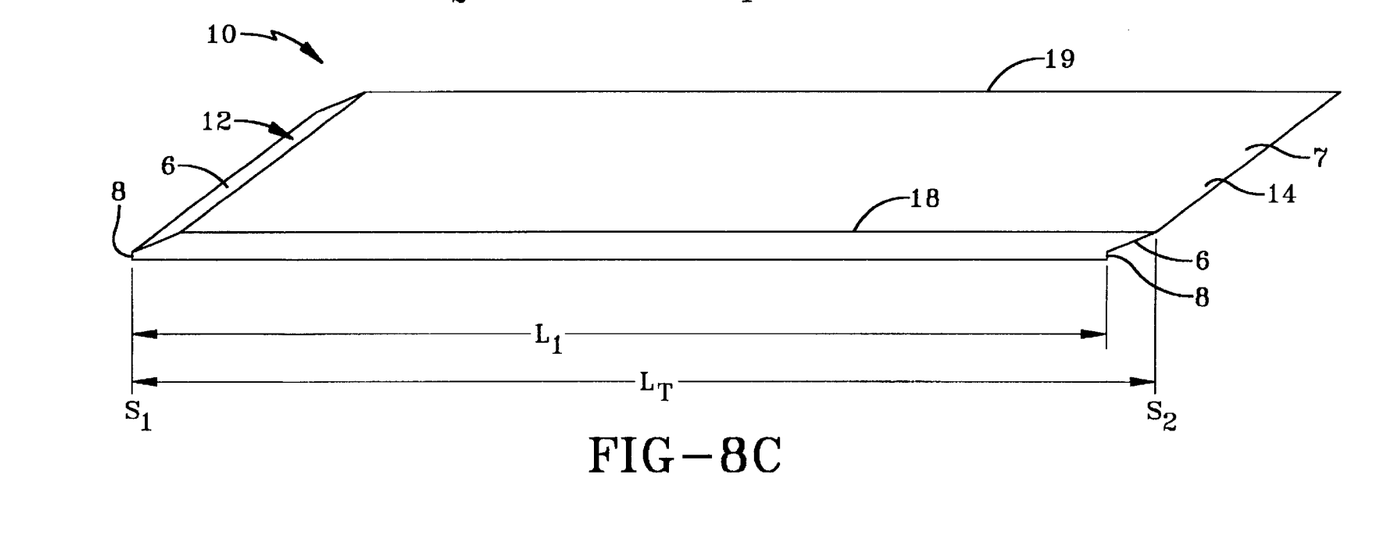
FIG. 8C the cut-to-length segment.

As shown in FIG. 8C the total length $L_T$ of the segment (10) can be substantially greater than the predetermined length $L_1$, $L_1$ being the length of the segment between location $S_1$ and $S_2$ as measured in any plane parallel to the segments edges (18, 19). The tip-to-tip, or total length $L_T$, of a segment whose ends are formed diagonally across the width of the segment (10) is naturally longer. The use of the abutment surface (8) to define the predetermined length $L_1$, even in the case where the low skive angle surfaces (6) are normal or perpendicular to the width of the strip (1) or segment (10) formed from the strip (1), it is believed most beneficial to use the abutment surfaces (8) and the respective distance $L_1$ there between to define the segment length $L_1$. The reason is that the overhanging low skive angle surface (6) can be cut so thin that the ends (14) can be distorted whereas the abutment surface (8) are not prone to folding or bending.

In one category of segment forming the elastomeric strip (1) has at least one cord reinforced layer (20), preferably for this invention, the cords (22) are laid on a diagonal (bias) or normal to the length of the strip (1). The cords (22), when laid in about the same direction as the length, creates a cut path that is generally too long for practical purposes. This is so because for the invention to achieve its desired benefits the low skive angle surface (6) and the abutment surface (8) must be in a path parallel to the reinforcing cord (22) orientation. Therefore, in tire building, the invention is most suited for use in bias or radial carcass plies (20) but not as well suited in overlays or belts having angles less than 17° relative to the length of the strip (1).

In the preferred method of practicing the invention it is most desirable to support the strip (1) on the second side (4). The second side (4) of the strip (1) is manufactured preferably substantially flat whereas the first side (2) can be flat or irregular in contour. As shown in FIGS. 5A and 5B, it is most preferred that the second side (4) is supported by a support that has a bend or contour support (108) in an area occupying a path (3) upon which the low angle skive surfaces (6) and the abutment surfaces (8) are to be formed. By contouring or bending the strip (1) across its width W the low angle skive surfaces (6) of the adjacent segments (10) as they are being formed naturally separate. As the overhanging skive surface (6) is cut, it is free to extend or open from the bent portion of the strip (1). The freshly cut elastomer is so tacky that unless the surfaces (6) are spaced from re-contacting they will rejoin automatically as though no cutting had occurred. The use of a contoured or bent surface achieves a simple yet reliable way to avoid this problem.

In the preferred method the first cut is achieved by employing a first cutting element (120), preferably an ultrasonic cutting element (120). The first cutting element (120) is oriented at an angle θ relative to the general horizontal surface or plane of the first side of the strip (1), it being understood that the first side (2) can be irregular or contoured. Preferably the angle θ is less than 30° as measured at or near the abutment surface. The inclined or contoured surface (108) supporting the cutting path (3) means that the skive angle θ may not be a constant, particularly when the bending of the strip (1) creates a slight radius of curvature. Nevertheless it is believed desirable that the skive surface (6) be inclined generally less than 30° and preferably about 10° or less as measured on the skive surface (6) near the abutment surface (8).

In one method employed to accomplish this low skive angle surface (6) the first cutting element (120) is oriented across a cutting path at an angle θ of about 0° to about 10° and is positioned to cut into the elastomeric strip (1) to a depth (d) wherein (d) is less than the total or maximum thickness t of the strip (1) and about aligned with the upper surface of the parallel cords (22). In other words, the first cut penetrates from the first side (2) to adjacent the one or more cords (22) regardless of the inclination θ of the first cutting element (12). The second abutment forming cut passes through two parallel adjacent cords (22) along the cut path (3) of the first cutting element (120). The second cutting element (122) is oriented at a high angle β, β preferably being normal or perpendicular to the length of the strip (1).

By moving or advancing the strip (1) a predetermined distance relative to the means (120) for forming the low angle skive surface (6) and the abutment surface (8) and repeating the method for forming these surfaces the second end (14) can be formed thereby completing the steps needed to make the segment (10). The steps are best accomplished by an apparatus (100) for forming segments (10) from a long strip (1) of elastomeric material.

Figure 7A:
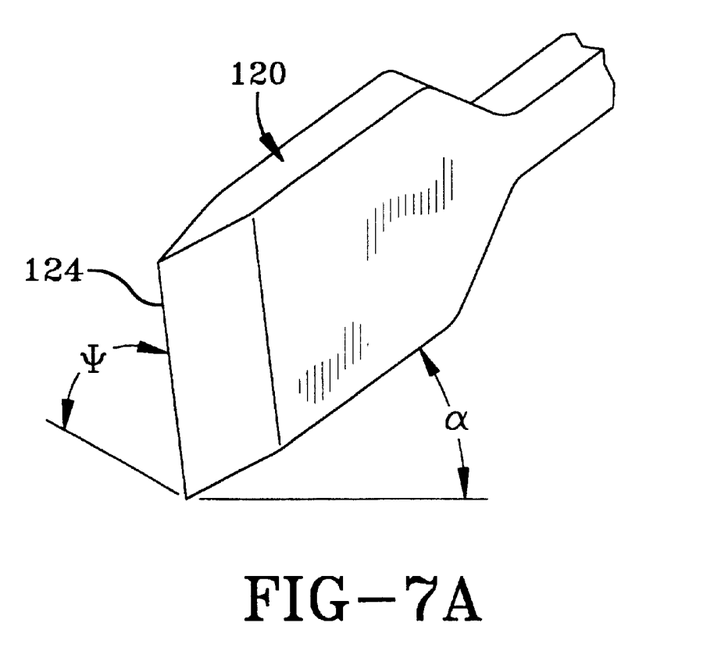
FIG. 7A is a perspective view of a first cutting element for forming the low skive angle surface, the preferred first cutting element being an ultrasonic knife.
Figure 7B:
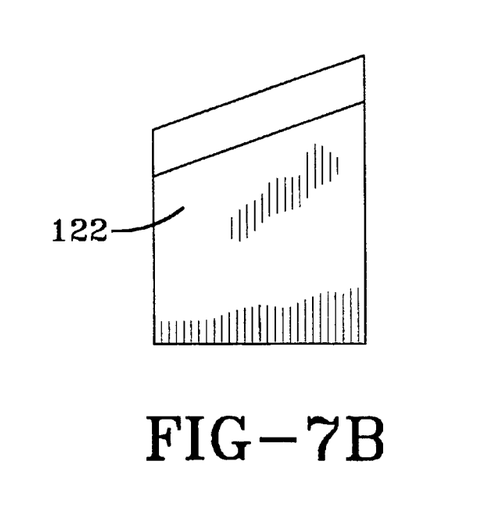
FIG. 7B shows a perspective view of the second cutting element passing between two parallel cords to form the abutment surfaces.

The apparatus (100) has a means (120) forming a low angle skive surface across the width of the strip. The means preferably is a first cutting element (120). In the most preferred apparatus, the first cutting element (120) is an ultrasonic knife. As shown in FIG. 7A, the knife (120) preferably has a somewhat wedge-like shape with a cutting edge (124) that is oriented at a fixed angle θ relative to the strip (1) and also is canted at a slight angle ψ such that the cutting edge (124) is inclined slightly. The dual angle setting of the first cutting element (120) achieves a superior and more uniform cut because the knife's cutting edge (124) is really the tip of a chisel type-cutting tool. Unlike a conventional ultrasonic low amplitude high frequency knife that cuts along a side of the blade, the chisel type blade has no node along the cutting edge (124) because the cutting edge is really the tip of the blade tilted slightly. This means that the excitation frequency is traveling the same distance all along the cutting edge (124). This fact enables the rubber to be cut more uniformly than conventionally by standard ultrasonic blade type cutters.

A second feature of the preferred apparatus (100) is a means (130) for moving the means for forming (120). The means (130) for moving preferably has a motor driven mechanism that slidably traverses the means for forming (120) across the width of the strip. The means for forming (120) ideally can be moved angularly relative to the strip length L to accommodate cutting along any bias angle.

The means for moving (130) also may include a means (140) for orienting the means (120) for forming at range of angles θ and ψ to achieve optimal skive surface area (6).

The means for forming also includes a second cutting element (122) for forming the abutment surfaces (8). The second cutting element (122) may be a hot knife or blade which preferably is oriented at an angle β. Optimally the same means for moving the first cutting element (120) can be used to move the second cutting element (122) along the cutting path (3). The step of cutting with the second cutting element (122) sequentially preferably should follow the cutting of the low skive angle surfaces (6) and, thus, completes the formation of the ends (12, 14) of a segment (10).

Figure 9:
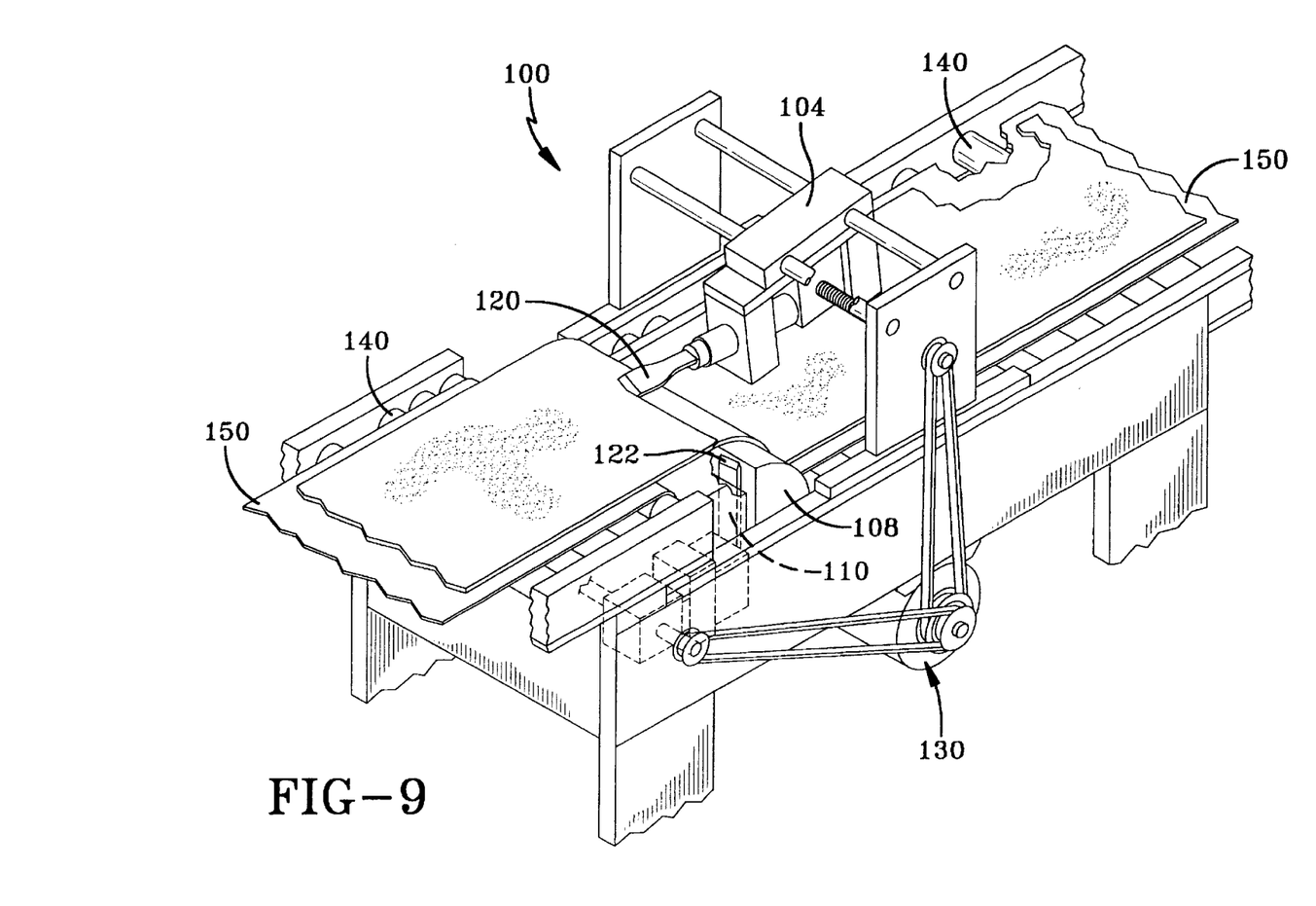
FIG. 9 is a perspective view of the preferred apparatus (100) or forming the segment.

As shown the preferred apparatus may include a conveyor means (150) to advance the strip along the direction of the strip length L. Preferably the conveyor means (150) would be capable of advancing the strip (1) to a predetermined distance to enable the strip (1) to be cut to form a segment (10) having a fixed length $L_1$ between the abutment surfaces (8) at location $S_1$ and $S_2$ as discussed. The conveyor (150) can be part of the means for supporting (140), preferably a first substantially flat portion (110). Adjacent this first substantially flat portion (110) is shown a second inclined or contoured portion (108) wherein the strip can be supported on one side and bent along this second inclined or contoured portion to form a cutting path (3) parallel to the direction of the bend in the strip (1). In the case where the strip has parallel cords (22), this bend path is also parallel to the orientation of the cords (22).

As previously noted by bending the strip (1) as shown the cutting of the low angle skive is facilitated because the cut surfaces remain spaced but equally importantly the strip itself is moved partially out of the way of the first cutting element (120) enabling the angle of cutting to be substantially lower than was heretofore achievable. As can be seen the angle θ can be as low as 0° relative to the horizontal plane of the strip, even lower if so desired. This feature enables the first cutting element (120) to be able to cut a very large low angle skive surface area (6) for improved splice joints. In the case of cord reinforced strips (1), the first cutting element (120) can cut to a depth (d) tangent to one or more cords (22). This cutting is similar to filleting the fleshy part of a fish adjacent but slightly above the rib bones of the fish. The resultant cut can be so close the cords (22) are similarly exposed along the cutting path (3). This means that the forming of the abutment surfaces (8) can be simplified because the cut depth can be very thin particularly when the cord reinforced layer is the second side (4) or a part thereof.

Those skilled in the art will appreciate that the means for supporting could alternatively be of a cylindrical shape enabling the bend to be anywhere along the circumference of the cylinder. The result being that a portion of the strip is bent out of the way of the cutting path. It is believed important that the strip should be sufficiently bent to insure the low angle skive surfaces do not reattach after cutting.

Once cut the segment (10), when used as a tire component, is cylindrically formed by splicing the cut ends (12, 14) as previously discussed. The segment can be thin, thick, flat or irregularly contoured, a single component, a multi-component, multi-material elastomer reinforced with cord or unreinforced as discussed.

The angular orientation of the surfaces can be selected for the optimal splicing joint for the particular strip.

While the strip may include some cured or partially cured components it is preferred that portions of the strip (1) be uncured or at least partially uncured. This permits the splice surfaces to exhibit the tacky self-sticking properties to facilitate joint adhesion.

While certain representative embodiments and details have been shown for the purpose of illustrating the invention, it will be apparent to those skilled in this art that various changes and modifications may be made therein without departing from the spirit or scope of the invention.

What is claimed is:

1. A method for forming a segment of elastomeric material of a predetermined length $L_1$ having tacky splicing surfaces at each end from a strip of elastomeric material, the strip having a length L, a width W, a thickness t, a first side and an opposite second side the method comprising:
   a) assembling a plurality of elastomeric strips of tire components to form the strip of elastomeric material, one or more of the strips of tire components being unvulcanized or partially unvulcanized, at least one strip of elastomeric material having reinforcing cords, the cords being substantially parallel and oriented similarly in the direction of a path formed across the width W of the strip by the ends of the segments being formed:
   b) forming a low angle skive surface across the width W of the strip the low angle skive surface extending from the first side of the strip to a predetermined depth (d), (d) being less than the thickness t of the strip;
   c) forming an abutment surface, the abutment surface being perpendicular to the strip plan and extending from the opposite second side of the strip across the width W of the strip intersecting the low angle skive surface thereby forming a first end of the strip, the abutment surface being at a first location $S_1$; wherein the step (b) of forming low angle skive surfaces includes the steps of bending the elastomeric strip along a path parallel to the cords and supporting the strip on the side opposite the side of the first cut, while cutting across the strip in a direction of a cut path substantially parallel and oriented similarly to the cords using a first cutting element, the first cutting being oriented at a desired skive angle θ cutting to the depth (d), the depth (d) being substantially tangent to one or more cords wherein the step of bending and the step supporting the strip includes the step of providing a contoured or inclined support adjacent or substantially flat or planar support; and the step (c) of forming an abutment surface includes the step of cutting across the strip between two adjacent cords with a second cutting element intersecting the first cut at or near the depth (d) forming one cut end of the segment; and
   d) repeating steps (a) and (b) at a second spaced location $S_2$ spaced a predetermined distance along the length of the strip from the location $S_1$ thereby forming the segment of elastomeric material of a predetermined length $L_1$ and an opposite second end, wherein one of the ends has a low angle skive surface extending inwardly along the length $L_1$ of the segment relative to that end's abutment surface at location $S_1$ and the opposite end has a low angle skive surface extending outwardly from the length $L_1$ of the segment relative to the abutment surface of that respective end at location $S_2$.

2. The method of claim 1 further comprising forming the segment into a substantially cylindrical shape by the step of splicing the first and second ends.

3. The method of claim 2 wherein the step of splicing the ends includes the step of contacting the abutment surfaces of each end thereby establishing the circumferential length of the cylindrical segment, and applying pressure along the low angle skive surfaces thereby forming a splice joint.

4. The method of claim 1 wherein the steps of forming a first end of one segment simultaneously includes the step of forming a second end of an adjacent segment from the strip of elastomeric material.

5. The method of claim 4 further comprises the step of bending the strip of elastomeric material across the width W of the strip along a path covering an area wherein a low angle skive surface is to be formed.

6. The method of claim 1, wherein the step of forming a low angle skive surface includes the step of cutting the elastomeric strip, the first cutting being oriented at a predetermined skive angle θ, the first cutting being limited at the predetermined depth (d), and wherein step (b) of forming an abutment surface includes the step of making a second cut across the strip intersecting the first cut forming one end of the segment.

7. The method of claim 1 wherein the step of making a second cut across the strip includes the step of cutting from the side of the strip opposite the first cut.

8. The method of claim 1 wherein the first cut is made by the cutting element, the cutting element being an ultrasonic knife.

9. The method of claim 1 wherein the second cut is made by a second cutting element.

10. The method of claim 1 wherein the step of making a first cut further includes the step of simultaneously forming two elastomeric splice surfaces, the first splice surface being above overlying and reinforced by a plurality of parallel cords, the second splice surface extending outwardly from the parallel cords forming an elastomeric flap unreinforced by cords.

11. The method of claim 10 wherein the steps of bending the strip and making a first cut includes the step of separating two elastomeric splice surfaces.

12. The method of claim 11 wherein the step of making a second cut further includes the step of separating the cut segment from the strip, thus, forming the two abutment surfaces.

13. The method of claim 12 further includes the step of advancing the cut strip to a predetermined distance, thus, establishing the length $L_1$ of the cut segment, from the first cut end abutment surface then repeating the method for cutting segments of claim 1 to make a second end.

14. The method of claim 1 further includes the steps of cylindrically forming the cut segment whereby the first cut end and the second cut end are abuttingly joined at the abutment surfaces; and splicing the elastomeric second end splice surface to the first end splice surface, thus, forming a spliced cylindrical segment.

15. An apparatus for cutting segments from a long strip of multi-layered elastomeric material containing reinforcing cords, the cords being substantially parallel and more or less oriented in the direction of a cut path, the apparatus characterized by:

a) a first cutting element for cutting from one side of the strip to a predetermined depth (d), (d) being substantially tangent to one or more cord, the first cutting element being an ultrasonic knife;

b) a second cutting element for cutting between two adjacent parallel cords, the second cutting element being a heated knife;

c) a means for moving the first and second cutting elements across the strip along the cut path;

d) a means for supporting the strip;

e) a means for orienting and maintaining the first cutting element at a desired skive angle $\theta$; and f) a means for maintaining the first cutting element at a predetermined depth.

16. The apparatus of claim 15 wherein the means for supporting the strip has a first substantially flat portion and a second inclined or contoured portion wherein the strip can be supported on one side and bent along the second inclined or contoured portion to form a cutting path parallel to the cords.

17. The apparatus of claim 15 wherein the first cutting element is maintained inclined at an angle $\theta$ substantially tangent to one or more cords for cutting one side of the strip opposite the side being supported.

18. The apparatus of claim 15 wherein the first portion of the supporting means is spaced from the second portion, interposed between the first and second portion of the supporting means is the second cutting element.

19. The apparatus of claim 18 wherein the second cutting element is positioned to cut from the side of the strip being supported to a depth substantially equal to the tangency of the cords at the first cut.

20. The apparatus of claim 19 wherein the second cutting element is oriented at an angle $\beta$, $\beta$ being substantially perpendicular relative to the first side of the strip.

21. The apparatus of claim 19 wherein the first cutting element is oriented at skive angle $\theta$, $\theta$ being substantially 30° less relative to the side of the strip supported by the first portion.

22. The apparatus of claim 19 wherein the skive angle $\theta$ of the first cutting element is about 10° or less adjacent the one or more cords tangent to the first cut.

* * * * *